United States Patent [19]

Usami

[11] Patent Number: 5,266,869
[45] Date of Patent: Nov. 30, 1993

[54] DISCHARGE LAMP LIGHTING APPARATUS HAVING OUTPUT IMPEDANCE WHICH LIMITS CURRENT FLOW THERETHROUGH AFTER START OF DISCHARGING

[75] Inventor: Yutaka Usami, Shizuoka, Japan

[73] Assignee: Tokyo Electric Co., Ltd., Tokyo, Japan

[21] Appl. No.: 764,783

[22] Filed: Sep. 24, 1991

[30] Foreign Application Priority Data

Sep. 27, 1990 [JP] Japan .................. 2-257679
Oct. 17, 1990 [JP] Japan .................. 2-276479

[51] Int. Cl.⁵ .................................. H05B 37/00
[52] U.S. Cl. .................................. 315/170; 315/171;
315/172; 315/173; 315/205; 315/208; 315/242;
315/244; 315/219; 315/277; 315/241 R;
315/239; 315/240; 315/224; 315/DIG. 5;
315/DIG. 7; 315/291
[58] Field of Search ............... 315/276, 277, 242, 244,
315/219, 205, 208, 241 R, 283, 239, 240, 283,
224, 170, 171, 172, 173, 200 R, DIG. 5, DIG. 7,
291

[56] References Cited

U.S. PATENT DOCUMENTS

| 1,827,705 | 10/1931 | Claude et al. | 315/200 R |
|---|---|---|---|
| 2,135,268 | 11/1938 | Alexanderson | 315/200 R |
| 2,654,051 | 9/1953 | Kenty | 315/200 R |
| 2,757,318 | 7/1956 | Noel et al. | 315/205 |
| 2,810,862 | 10/1957 | Smith | 315/205 |
| 3,638,070 | 1/1972 | Powell | 315/170 |
| 3,789,266 | 1/1974 | Polman et al. | 315/194 |
| 4,394,603 | 7/1983 | Widmayer | 315/205 |
| 4,550,272 | 10/1985 | Kimura et al. | 315/205 |

FOREIGN PATENT DOCUMENTS

| 0027039 | 4/1981 | European Pat. Off. . | |
| 3424991 | 2/1986 | Fed. Rep. of Germany . | |
| 1294504 | 7/1961 | France | 315/244 |
| 56-46320 | 10/1981 | Japan . | |
| 62-296394 | 12/1987 | Japan . | |

*Primary Examiner*—Robert J. Pascal
*Assistant Examiner*—Michael B. Shingleton
*Attorney, Agent, or Firm*—Frishauf, Holtz, Goodman & Woodward

[57] ABSTRACT

A discharge lamp lighting apparatus comprises a transformer for stepping up an AC power source voltage from an AC power source to produce a high voltage as an output voltage required for lighting a discharge lamp. Particularly, the lighting apparatus further comprises a diode for rectifying the output voltage of the transformer to be supplied to the discharge lamp. The amount of current supply from the AC power source is determined to obtain an output impedance capable of limiting the current which is to flow through the discharge lamp after the start of discharging to maintain the voltage across the discharge lamp at a level required for continuing the discharge.

21 Claims, 12 Drawing Sheets

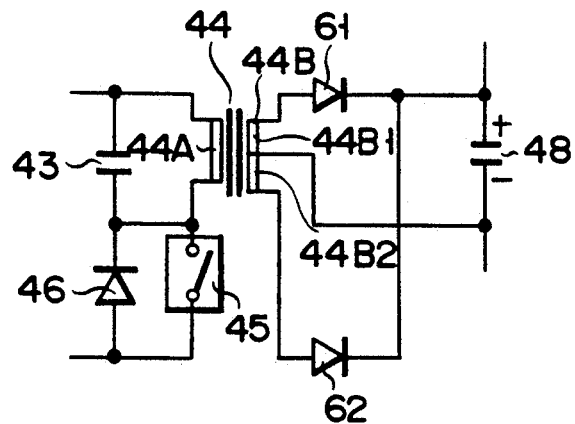
F I G. 11A
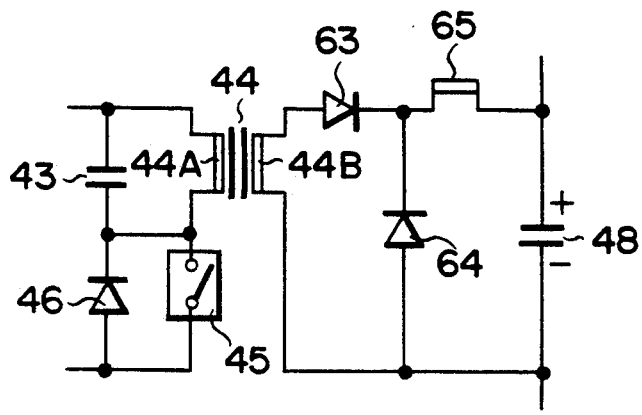
F I G. 11B
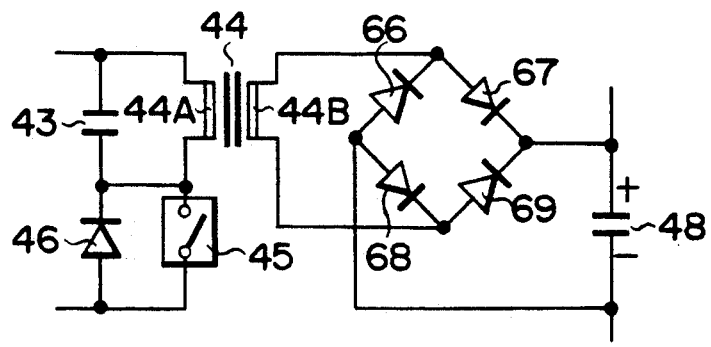
F I G. 11C

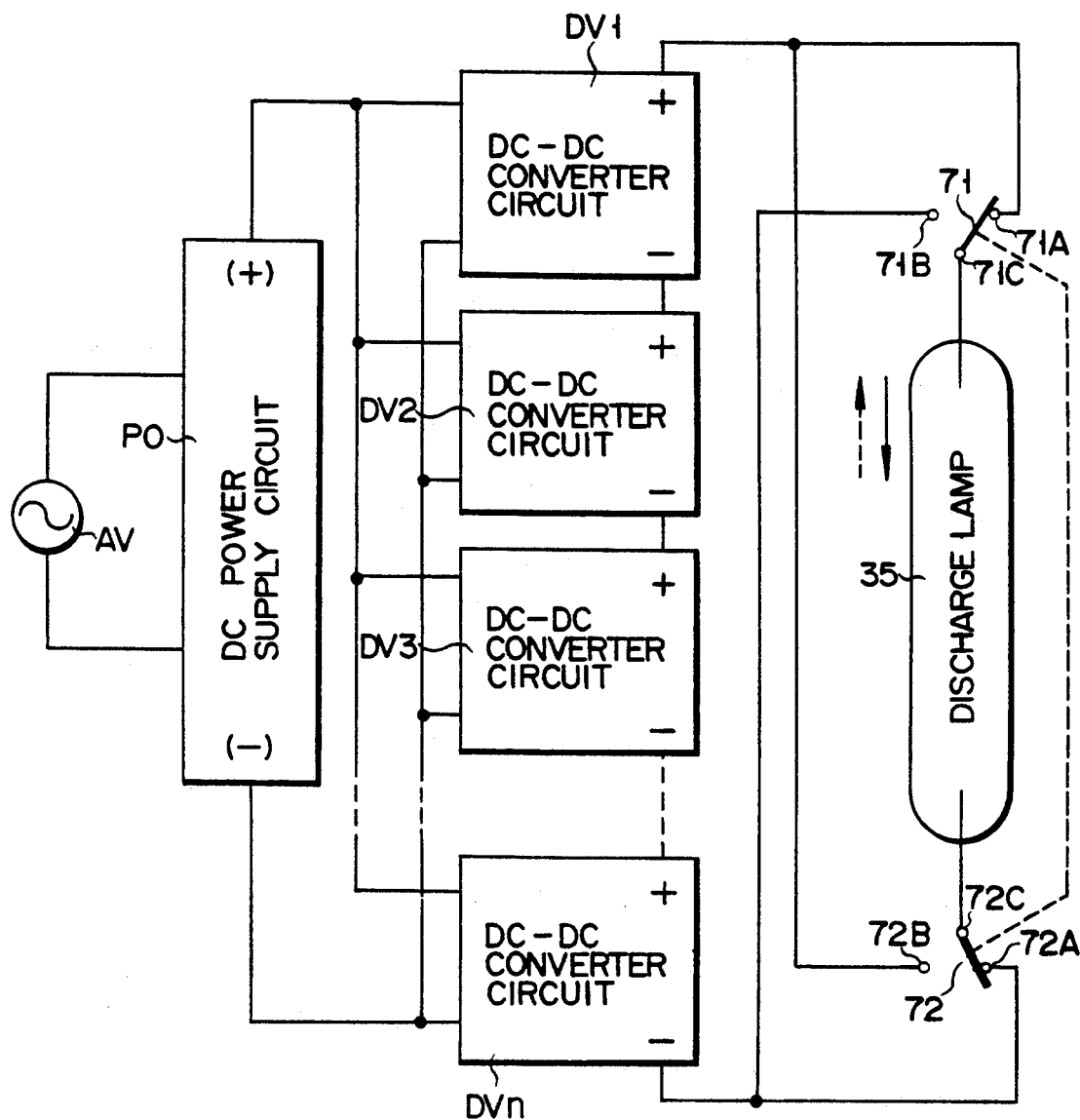
F I G. 12

DISCHARGE LAMP LIGHTING APPARATUS HAVING OUTPUT IMPEDANCE WHICH LIMITS CURRENT FLOW THERETHROUGH AFTER START OF DISCHARGING

BACKGROUND OF THE INVENTION

1. Field of the Invention

The present invention relates to a discharge lamp lighting apparatus for lighting a discharge lamp such as, for example, a fluorescent lamp.

2. Description of the Related Art

Heretofore, discharge lamp lighting apparatuses as shown in FIGS. 1, 2 and 3 are known.

A discharge lamp lighting apparatus shown in FIG. 1 has a transformer 2 having a primary winding 2A and a secondary winding 2B magnetically coupled to the winding 2A. The primary winding 2A is connected to a commercial AC power source 1, and the secondary winding 2B is connected to a discharge lamp 3. In this apparatus, the self-inductance of the primary winding 2A and the mutual inductance of the primary and secondary windings 2A and 2B are operated as an impedance to the AC power source 1. Electric power is transmitted from the primary winding 2A side to the secondary winding 2B side by the mutual inductance. The number of turns of the secondary winding 2B is larger than that of the primary winding 2A so as to apply a high voltage to the discharge lamp 3. The impedance of the discharge lamp 3 abruptly drops from an infinite level by the start of discharging. At this time, the secondary winding 2B is operated as a choke coil for limiting the sine wave current which is to flow through the discharge lamp 3 to maintain the voltage applied to the discharge lamp 3 at a high level. Thus, the discharge of the discharge lamp 3 is continued.

The discharge lamp lighting apparatus shown in FIG. 2 has a half-wave voltage resonance type inverter. This inverter has a DC power supply circuit 4, a capacitor 5, a transformer 6, a resonance switch 7, a diode 8, a capacitor 9 and a choke coil 10.

The DC power supply circuit 4 has a filter, a rectifier, a smoothing capacitor, etc., to convert an AC voltage from the commercial AC power source 1 into a DC voltage. The capacitor 5 is connected in parallel with the primary winding 6A of the transformer 6 to form a resonance circuit. The resonance switch 7 is connected in series with the resonance circuit between the positive and negative terminals of the DC power supply circuit 4, and the diode 8 is connected in parallel with the resonance switch 7. The resonance switch 7 is constituted by a switching transistor and a control circuit for switching the transistor, for example. The secondary winding 6B of the transformer 6 is connected in series with the capacitor 9 and the choke coil 10 between both ends of the discharge lamp 3.

In this apparatus, when the resonance switch 7 is closed to electrically connect the resonance circuit to the DC power supply circuit 4, a current flows through the primary winding 6A. After the resonance switch 5 is opened, the primary winding 6A causes the current to continuously flow for a while and the capacitor 5 is charged by the current from the primary winding 6A. After the charging, the capacitor 5 causes the current to reversely flow through the primary winding 6A so as to keep the power supplied from the DC power supply circuit 4. The potential of the junction of the switch 7 and capacitor 5 tends to drop below that of the negative terminal of the DC power supply circuit 4 while the junction is electrically disconnected from the negative terminal. The diode 8 is set in a forward-biased state by the potential drop, and allows a current to flow from the negative terminal to the junction. Accordingly, the potential of the junction is maintained at a level not lower than that of the negative terminal. The resonance switch 7 is again closed while the current flows through the diode 8. When the resonance switch 7 is closed, the direction of the current flowing through the primary winding 6A is reversed with a delay of time. Thereafter, the above-described operation is again repeated.

Since the resonance switch 7 is closed while the potential difference between both ends thereof is set at substantially zero by the diode 8, it is possible to suppress the power loss in an LC resonance between the capacitor 5 and the primary winding 6A. Part of the resonance energy is transmitted from the primary winding 6A to the secondary winding 6B to allow an AC current to flow in the secondary winding 6B. This AC current is smoothed by the choke coil 10 to become a sine wave, and supplied to the discharge lamp 3. The capacitor 9 removes DC component from the current supplied to the discharge lamp 3.

The discharge lamp lighting apparatus shown in FIG. 3 has a half-bridge type inverter. This inverter has a DC power supply circuit 4, diodes 11 and 12, switches 13 and 14, capacitors 15 and 16, and a choke coil 17. The cathode terminal of the diode 11 is connected to the positive terminal of the DC power supply circuit 4, the anode terminal of the diode 11 is connected to the cathode terminal of the diode 12, and the anode terminal of the diode 12 is connected to the negative terminal of the DC power supply circuit 4. The switches 13 and 14 are respectively connected in parallel with the diodes 11 and 12. The capacitors 15 and 16 are connected in series between the positive and negative terminals of the DC power supply circuit 4, and a discharge lamp 3 is connected in series with the choke coil 17 between the junction of the capacitors 15 and 16 and the junction of the diodes 11 and 12.

In this apparatus, the switches 13 and 14 are alternatively closed. When the switch 13 is closed and the switch 14 is opened, a current flows from the positive terminal of the DC power supply circuit 4 through the switch 13, the choke coil 17, and the discharge lamp 3 to the capacitors 15 and 16. The capacitors 15 and 16 are changed by the current. Then, the switch 13 is opened. At this time, a current flows from the negative terminal of the DC power supply circuit 4 through the diode 12, the choke coil 17, and the discharge lamp 3 to the capacitors 15 and 16, since the choke coil 17 operates to allow the current to continue flowing therethrough. The switch 14 is closed when the potential difference between both ends of the switch 14 becomes zero by the current flowing through the diode 12. At this time, the capacitors 15 and 16 discharge the stored charges as a current, which flows through the discharge lamp 3, the choke coil 17, and the diode 12 to the negative terminal of the DC power supply circuit 4. Then, the switch 14 is opened. At this time, a current flows from the capacitors 15 and 16 through the discharge lamp 3, the choke coil 17 and the diode 11 to the positive terminal of the DC power supply circuit 4, since the choke coil 17 operates to allow the current to continue flowing therethrough. The above-described switching operation is repeated in the subsequent cycles. Similarly to the apparatus shown in FIG. 2, this discharge lamp lighting apparatus can suppress the power loss in an LC resonance between the capacitors 15 and 16 and the choke coil 17.

However, the configurations of the discharge lamp lighting apparatuses shown in FIGS. 1 to 3 do not allow for reductions in size and weight.

Since the discharge lamp lighting apparatus shown in FIG. 1 employs the commercial AC power source 1 at a frequency of about 50 Hz, a transformer having a large inductance is needed to obtain an output impedance capable of maintaining the voltage applied to the discharge lamp 3 at a high level required for continuing the discharge after the discharge lamp is ignited. The size and weight of such a transformer are substantially proportional to the inductance thereof. The inductance of the transformer can be reduced, for example, by increasing the frequency of the power source. However, this alternation is restricted since the discharge lamp must be lit without bearing harmful radiations, which are controlled by regulations.

When a fluorescent lamp is AC-lit as the discharge lamp, it is desirable to set the lighting frequency (=the frequency of the power source voltage) within a range of 10 kHz to 50 kHz so as to comply with the regulations. If the lighting frequency is set outside of this range, infrared remote controllers and radio receivers, for example, can not operate properly due to interference from the radio and infrared noises radiated from the lamp. Therefore, the frequency of the power source voltage cannot be increased over 50 kHz. The size and weight of the transformer cannot be satisfactorily reduced with the alteration of the frequency of this degree.

In the discharge lamp lighting apparatus shown in FIGS. 2 and 3, the lighting frequency of the discharge lamp is determined according to the resonance frequency $f = 1/(2\pi\sqrt{LC})$, of the inverter. Since the resonance circuit is composed in combination of the coil, the transformer and the capacitor, the size and weight can be reduced as compared with the case of preparing the sole transformer as in the apparatus shown in FIG. 1. However, if the resonance frequency of the inverter is increased higher than 50 kHz, the harmful infrared and radio noises are radiated from the discharge lamp similarly to the apparatus shown in FIG. 1. Thus, it is difficult to form the resonance circuit by using circuit parts of smaller sizes and lighter weights.

FIGS. 4 and 5 are plan and side views of an example of mounting parts of a discharge lamp lighting apparatus shown in FIG. 3. The circuit parts of the example have the necessary lowest withstand voltages and element values necessary to set the resonance frequency to 50 kHz or less, and are mounted on a circuit board 18 of phenol resin substantially as groups of functional modules. Transistors 24 (i.e., switches 13 and 14) are fixed to a heat sink plate 23, and disposed at the center of the circuit board together with a current transformer 25, a control part 26, and preheating capacitors 27. The current transformer 25 is used to supply base currents to the transistors 24 for self-excited oscillation. A fuse 19 and a DC power supply circuit 4 (i.e., filter elements 20, a rectifier 21, a smoothing capacitor 22) are disposed on one side of the circuit board 18. Further, resonance capacitors 15 and 16 and a choke coil 17 are disposed on the other side of the circuit board 18. An insulation film 29 is adhered to the rear surface of the circuit board 18 opposed to the front surface in which the circuit parts exist, and the circuit board 18 is placed in an aluminum case 28.

As shown in FIGS. 4 and 5, the choke coil 17, the current transformer 25 and the resonance capacitors 15 and 16 are larger than the other circuit parts. Accordingly, when all the circuit parts are mounted on the circuit board 18, the heights are irregular. The height of the aluminum case 28 must be determined in coincidence with the largest part. This make it difficult to reduce the thickness of the entire discharge lamp lighting apparatus.

SUMMARY OF THE INVENTION

Accordingly, an object of the present invention is to provide a discharge lamp lighting apparatus allowing for reductions in size and weight.

This object is achieved by a discharge lamp lighting apparatus which comprises a transformer unit for stepping up an AC power source voltage from an AC power source to produce a high voltage as an output voltage required for lighting a discharge lamp, and a rectifier for rectifying the output voltage of the transformer unit to be supplied to a discharge lamp, and the amount of current supply from the AC power source is determined to obtain an output impedance capable of limiting the current which is to flow through the discharge lamp after the start of discharging to maintain the voltage across the discharge lamp at a level required for continuing the discharge.

In this discharge lamp lighting apparatus, an output voltage of the transformer unit is rectified and supplied to the discharge lamp. Since the discharge lamp is DC-lit, it is not necessary to determine the frequency of the power source voltage and the inductance of the transformer unit by considering the harmful radiations from the discharge lamp. Therefore, it is possible to obtain a desired output impedance even if the inductance of the transformer unit is lowered to reduce the size and weight of the apparatus as compared with those of the conventional apparatus. Since an additional impedance element, such as a resistor, etc., is not used to obtain the desired output impedance, an increase in power loss can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are in and constitute a part of the specification, illustrate presently preferred embodiments of the invention, and together with the general description given above and the detailed description of the preferred embodiments given below, serve to explain the principles of the invention.

FIGS. 11A to 11C show modifications of the DC-DC converter circuit shown in FIG. 8;

FIG. 12 is a circuit diagram of a discharge lamp lighting apparatus according to a fourth embodiment of the present invention, which apparatus is similar to the apparatus shown in FIG. 8 and has a switch for reversing the polarity of a discharge lamp;

DETAILED DESCRIPTION OF THE PREFERRED EMBODIMENTS

A discharge lamp lighting apparatus according to a first embodiment of the present invention will now be described with reference to FIG. 6.

Figure 6:
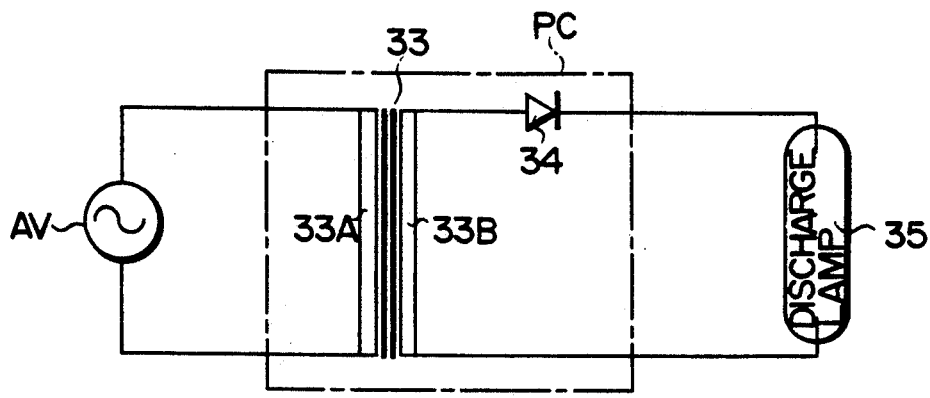
FIG. 6 is a circuit diagram of a discharge lamp lighting apparatus according to first embodiment of the present invention.

FIG. 6 shows a circuit of the discharge lamp lighting apparatus. This discharge lamp lighting apparatus comprises a DC power supply circuit PC for converting a high frequency power source voltage supplied from an AC power source AV into a DC high voltage necessary for lighting a discharge lamp. The DC power supply circuit PC has a transformer 33 for stepping up the high frequency power source voltage and a diode 34 for rectifying the step-up power source voltage supplied from the transformer 33. The transformer 33 has a primary winding 33A connected to the AC power source AV, and a secondary winding 33B connected to a discharge lamp 35 through the diode 34. The primary winding 33A is magnetically coupled to the secondary winding 33B with a relatively weak coupling magnitude, and a regulated current from the AC power source AV flows through the primary winding 33A. Therefore, the DC power supply circuit PC has an output impedance capable of limiting the current which is to flow through the discharge lamp 35 after the start of discharging to maintain the voltage across the discharge lamp 35 at a level required for continuing the discharge.

The discharge lamp lighting apparatus of the first embodiment supplies a DC voltage to the discharge lamp 35 in place of an AC voltage. Therefore, it is not necessary to determine the frequency of the power source voltage and the inductance of the transformer 33 by considering radio and infrared noises. That is, the frequency of the power source voltage can be increased to a sufficiently high level. In this case, transformer 33 does not require a large inductance to obtain a desired output impedance for continuing the discharge of the discharge lamp. Accordingly, the transformer 33 can be reduced in size and weight more than those of a conventional one. Since the apparatus does not use an impedance element such as a resistor, etc., to limit the current which is to flow through the discharge lamp, an increase in power loss can be prevented.

Figure 7:
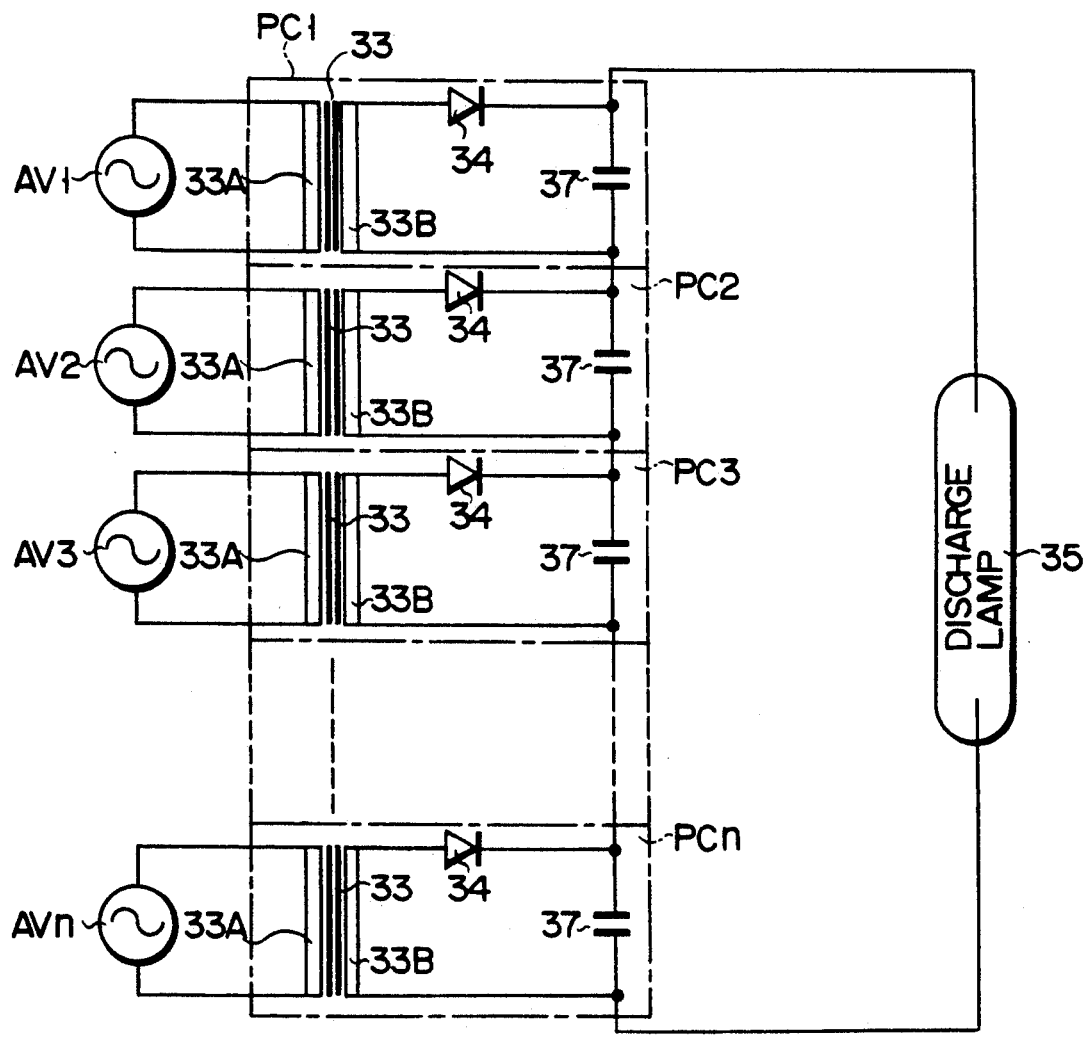
FIG. 7 is a circuit diagram of a discharge lamp lighting apparatus according to a second embodiment of the present invention, which apparatus has a plurality of DC power supply circuits associated to generate a DC high voltage.

FIG. 7 shows a circuit of a discharge lamp lighting apparatus according to a second embodiment of the present invention. This discharge lamp lighting apparatus comprises n number of DC power supply circuits PC1 to PCn for respectively converting AC power source voltages supplied from AC power sources AV1 to AVn, such as commercial AC power sources, into DC voltages, which together produce a DC high voltage necessary for lighting a discharge lamp 35. Each of the DC power supply circuits PC1 to PCn has a transformer 33 for stepping up a corresponding power source voltage, a diode 34 for rectifying the step-up power source voltage, and an output capacitor 37 to be charged by the rectified power source voltage. The transformer 33 has a primary winding 33A connected to a corresponding one of the AC power sources AV1 to AVn, and a secondary winding 33B connected to the output capacitor 37 through the diode 34. The primary winding 33A is magnetically coupled to the secondary winding 33B with a relatively weak coupled magnitude, and a regulated current from one of AC power sources AV1 to AVn flows through the primary winging 33A. The output capacitors 37 of the DC power supply circuits PC1 to PCn are connected in series with each other, and the series circuit of these capacitors 37 is connected in parallel with the discharge lamp 35. The DC power supply circuits PC1 to PCn have a total output impedance capable of limiting the current which is to flow through the discharge lamp 35 after the start of discharging to maintain the voltage across the discharge lamp 35 at a level required for continuing the discharge.

When the AC power sources AV1 to AVn are turned ON, a current flows through the primary winding 33A of the transformer 33 in each of the DC power supply circuits PC1 to PCn, and a current is excited in the secondary winding 33B by means of the mutual inductance between the windings 33A and 33B. The current is rectified by the diode 34, and charges the output capacitor 37. The output capacitors 37 of the DC power supply circuits PC1 to PCn are charged in the same polarity so as to supply the sum of the voltages across the output capacitors 37 to the discharge lamp 35.

In the discharge lamp lighting apparatus of the second embodiment, a high voltage is supplied to the discharge lamp by the cooperation of the DC power supply circuits PC1 to PCn. Thus, the DC power supply circuits PC1 to PCn can be composed of small-sized parts having lower withstand voltages than that of the first embodiment. Such DC power supply circuits PC1 to PCn can be mass-produced since they have the same configuration. Accordingly, it is possible to reduce their cost as compared with the case where the large-sized parts having high withstand voltages are produced by a small number. Further, the output impedances of the DC power supply circuits PC1 to PCn depends on the transformer 33 and also the capacitor 37. If the capacitor 37 is set to have a small capacitance, it is not necessary to increase the frequency of the power source voltage or the inductance of the transformer 33 to obtain a desired output impedance for continuing the discharge of the discharge lamp 35. In this case, the sizes of the circuit parts to be mounted can be made more uniform. Since the apparatus does not use an impedance element such as a resistor, etc., to limit the current which is to flow through the discharge lamp, an increase in power loss can be prevented similarly to the first embodiment.

Figure 8:
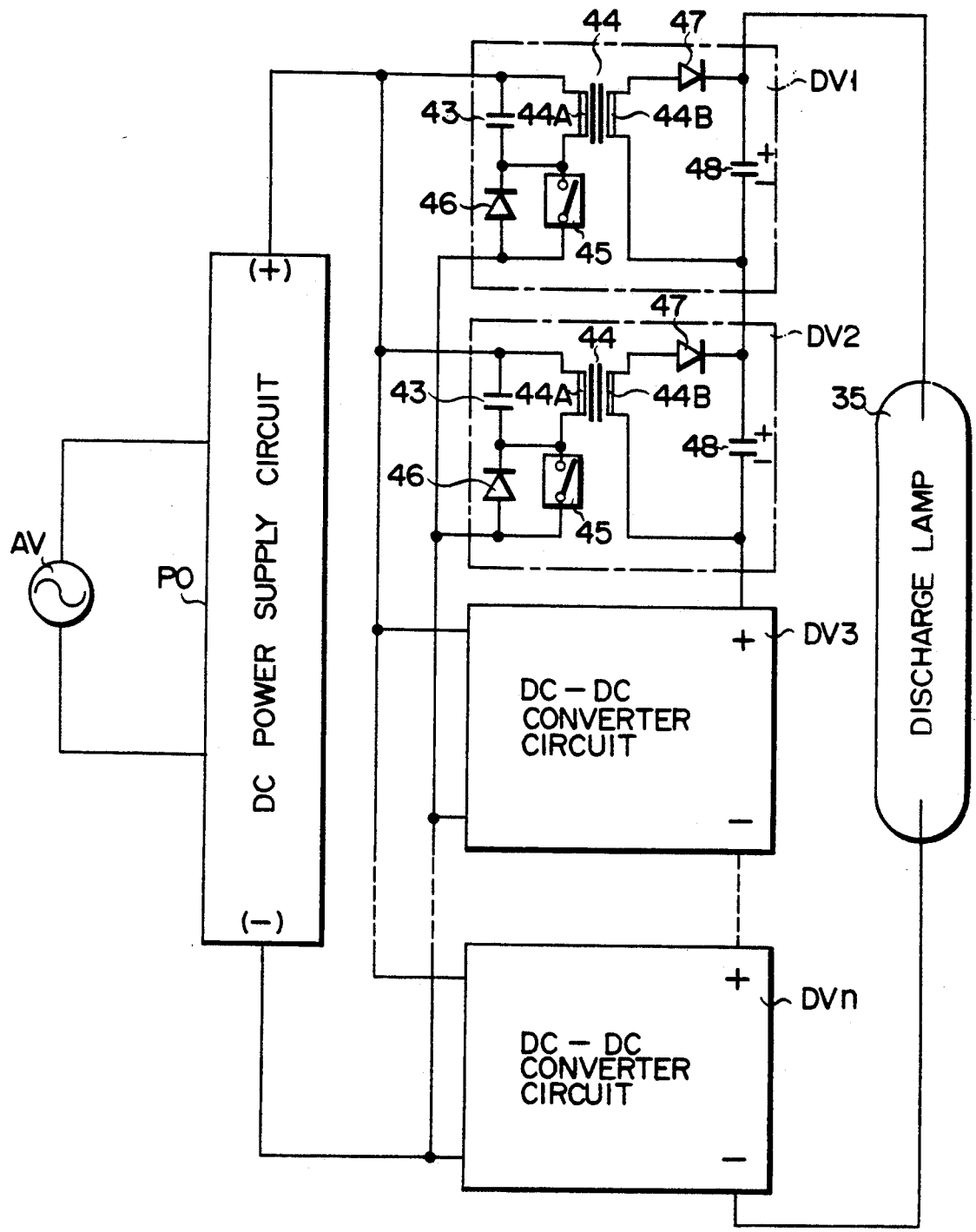
FIG. 8 is a circuit diagram of a discharge lamp lighting apparatus according to a third embodiment of the present invention, which apparatus has DC-DC converter circuits in place of the DC power supply circuits shown in FIG. 7.

FIG. 8 shows a circuit of a discharge lamp lighting apparatus according to a third embodiment of the present invention. This discharge lamp lighting apparatus comprises a DC power supply circuit PO for AC-DC converting a power source voltage supplied from an AC power source AV such as a commercial AC power source, and n number of DC-DC converter circuits DV1 to DVn for converting the power source voltages supplied from the AC power supply circuit into DC voltages, which together produce a high DC voltage necessary for lighting a discharge lamp 35. The DC power supply circuit PO outputs a DC voltage lower than the AC voltage input thereto, and has a rectifier, a smoothing capacitor, and a switching power supply unit. For example, when a power source voltage of 100 V is supplied from the commercial AC power source, the rectifier rectifies the power source voltage into a pulsating voltage, the smoothing capacitor smooths the output voltage of the rectifier, and the switching power supply unit steps down the output voltage of the smoothing circuit to a low DC voltage of about 12 V. Each of the DC-DC converter circuits DV1 to DVn has capacitors 43 and 48, a transformer 44, a resonance switch 45, and diodes 46 and 47. The resonance switch 45 has a switching transistor and a control circuit for switching the transistor. The capacitor 43 is connected in parallel with the primary winding 44A of the transformer 44 to form a resonance circuit. The resonance circuit is connected in series with the resonance switch 45 between the positive and negative terminals of the DC power supply circuit PO, and the diode 46 is connected in parallel with the resonance switch 45. Thus, the capacitor 43, the primary winding 44A, the resonance switch 45 and the diode 45 constitute a DC-AC converting section which oscillates at a high frequency via a half-wave voltage resonance. The secondary winding 44B of the transformer 44 is connected to the output capacitor 48 through the diode 47. The output capacitors 48 of the DC-DC converter circuits DV1 to DVn are connected in series with each other, and the series circuit of these capacitors 48 is connected in parallel with the discharge lamp 35.

The sum of the output impedances of the DC-DC converter circuits DV1 to DVn is set at a value capable of limiting the current which is to flow through the discharge lamp 35 after the start of discharging to maintain the voltage across the discharge lamp 35 at a level required for continuing the discharge.

In the third embodiment of the discharge lamp lighting apparatus, the resonance switches 45 of the DC-DC converter circuits DV1 to DVn are repeatedly turned ON and OFF synchronously. Then, high frequency voltages are generated in the secondary winding 44B of the transformer 44 in the DC-DC converter circuits DV1 to DVn, the high frequency voltages are rectified by the diode 47, and further smoothed by the output capacitor 48. When the DC voltages are output from the output capacitors 48 of the DC-DC converter circuits DV1 to DVn in this manner, the high DC voltage of n times as high as the output DC voltage is applied to the discharge lamp 35. For example, it is assumed that the total number n of the DC-DC converter circuits is 10 and the DC voltage of 50 V is output from each output capacitor 48. Then, the DC voltage of 500 V is applied to the discharge lamp 35 to be lit. It is also assumed that the capacitance of each output capacitor 48 is 0.022 $\mu F$. The total capacitance is set at a small value of 0.0022 $\mu F$. Accordingly, the total output impedance can be sufficiently increased to restrict an increase in the current flowing through the discharge lamp 35 after the start of discharging. The oscillation frequency of each DC-DC converter circuit (i.e., the resonance frequency of each resonance circuit) is irrespective of the lighting frequency of the discharge lamp 35, and can be set at 1 MHz or more. This makes it unnecessary to use large-sized transformers and capacitors to form the DC-DC converter circuits DV1 to DVn. Accordingly, the circuit parts can be similarly reduced in size and weight to those of the second embodiment.

Figure 9:
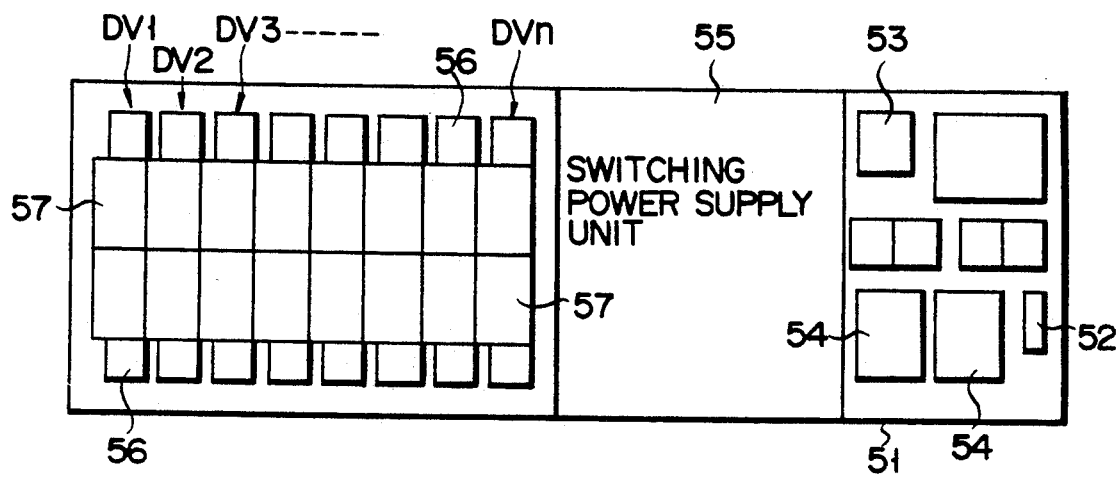
FIGS. 9 and 10 are plan and side views of a parts mounting example of a discharge lamp lighting apparatus shown in FIG. 8.
Figure 10:
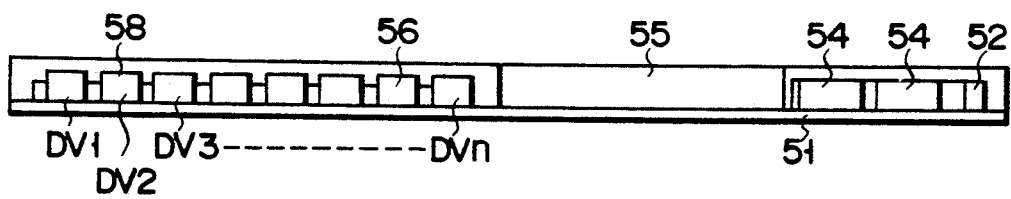

FIGS. 9 and 10 are plan and side views of the embodiment of the discharge lamp lighting apparatus shown in FIG. 8. The units of the DC power supply circuit PO and the DC-DC converter circuits DV1 to DVn are mounted on a circuit board 51. The parts mounting surface of the circuit board 51 is covered with molding resin 58 for sealing the mounted parts, and its rear surface is metal-shielded through an insulating layer. The DC power supply circuit PO is disposed on one side of the circuit board 51, and the circuit group of the DC-DC converter circuits DV1 to DVn are disposed on the other side of the circuit board 51. Reference numerals 52, 53, 54 and 55 respectively denote a fuse, a rectifier, a smoothing capacitor and a switching power supply unit 55 which constitute the DC power supply circuit PO. Reference numerals 56 and 57 respectively denote a transformer and other control circuit parts of each of the DC-DC converter circuits DV1 to DVn.

Figure 1:
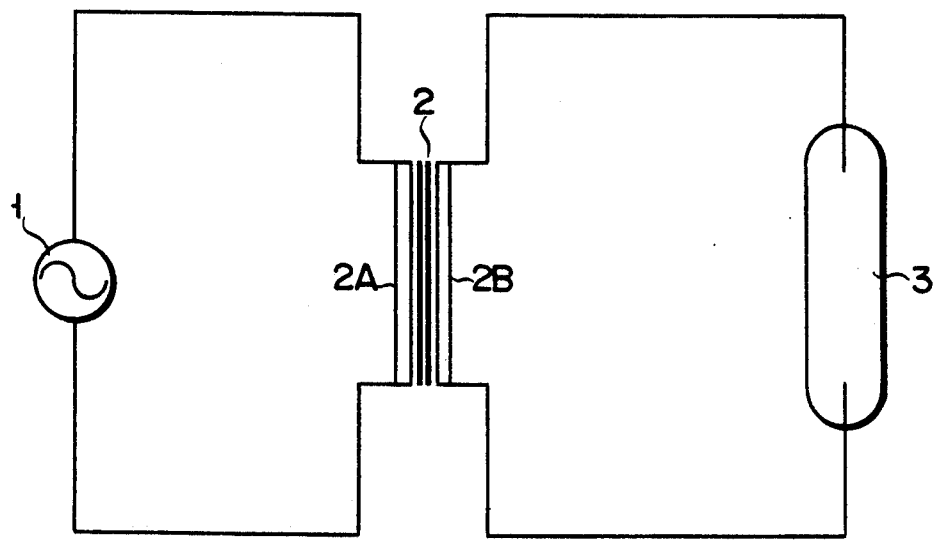
FIG. 1 is a circuit diagram of a conventional discharge lamp lighting apparatus having a transformer.
Figure 2:
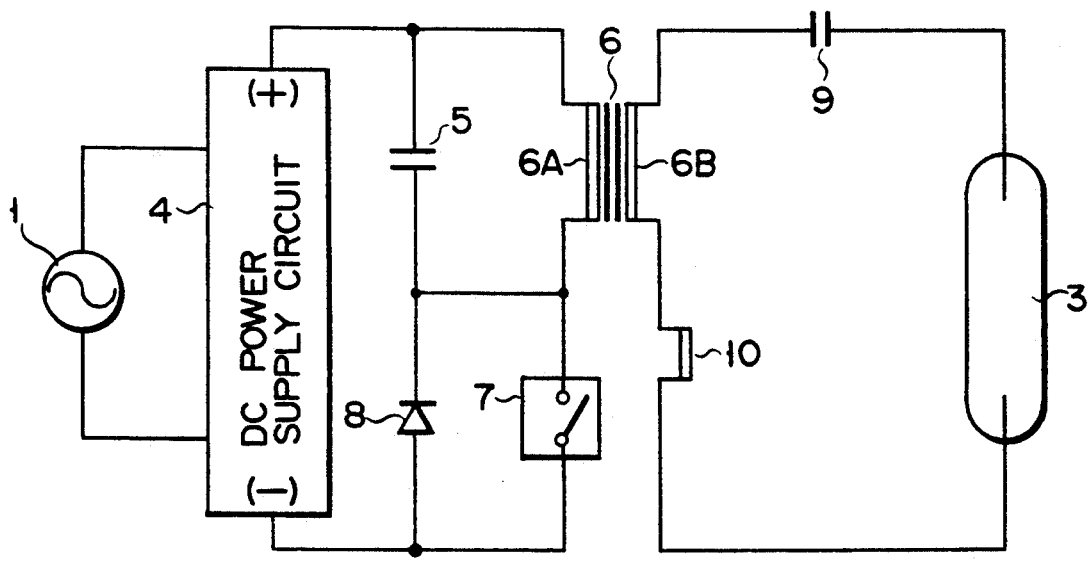
FIG. 2 is a circuit diagram of a conventional discharge lamp lighting apparatus having a half-wave voltage resonance type inverter.
Figure 3:
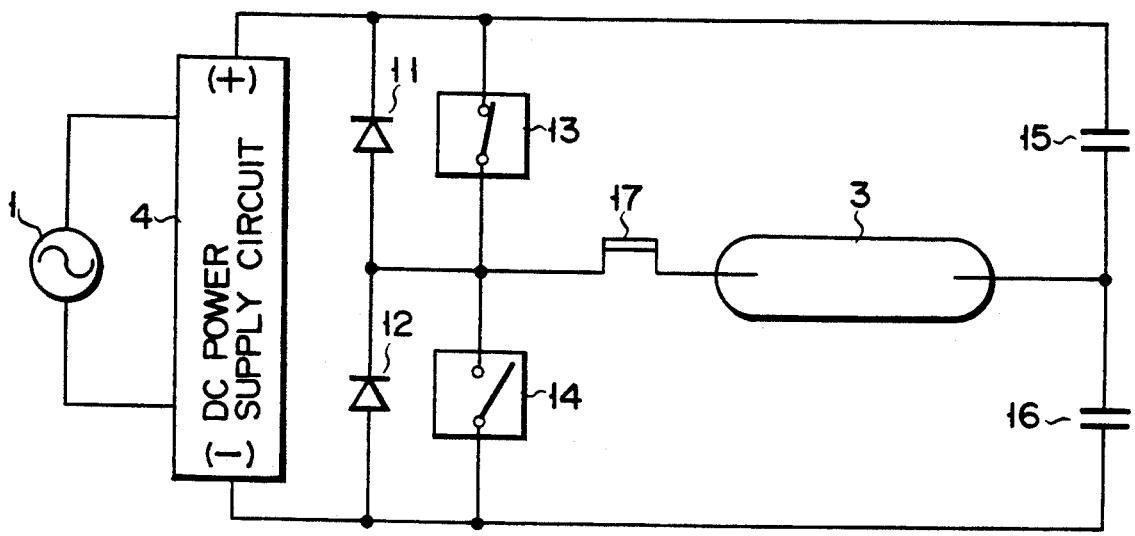
FIG. 3 is a circuit diagram of a conventional discharge lamp lighting apparatus having a half bridge type inverter.
Figure 4:
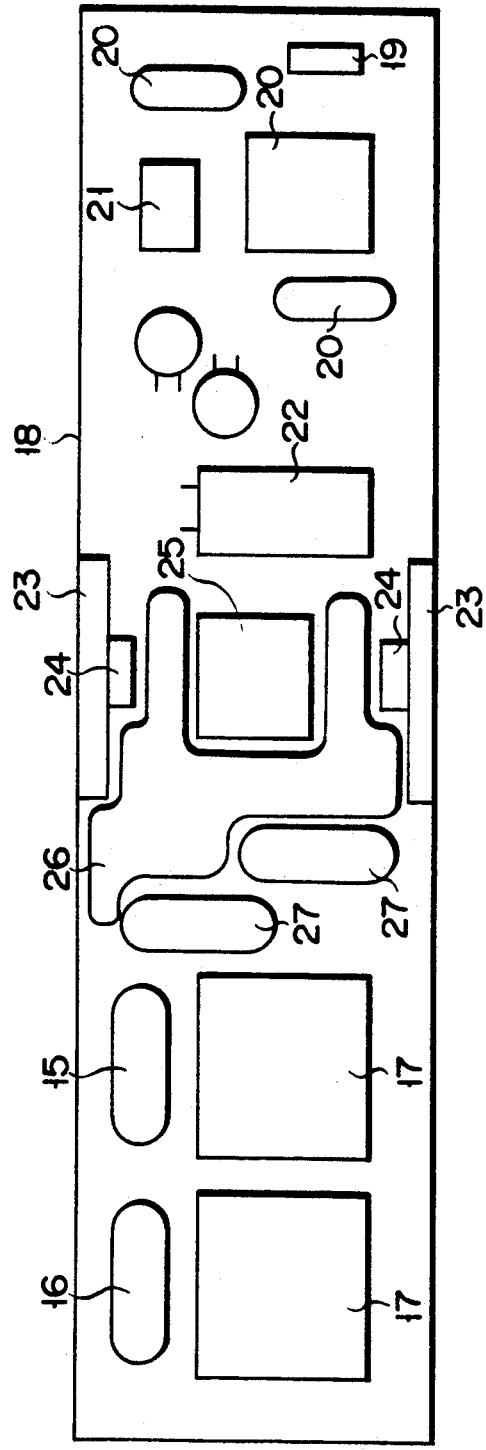
FIGS. 4 and 5 are respectively plan and side views of part mounting example of a discharge lamp lighting apparatus shown in FIG. 3.
Figure 5:
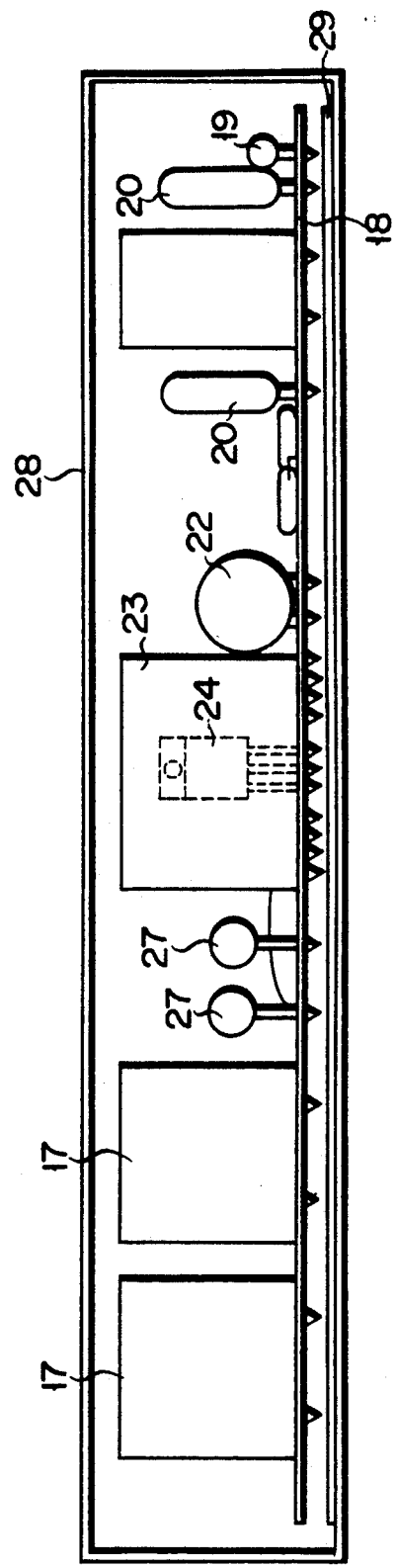

According to this embodiment, it is possible to suppress the height of the discharge lamp lighting apparatus to 9 mm when the circuit parts are actually mounted on the circuit board 51. This height is considerably low since the conventional discharge lamp lighting apparatus shown in FIGS. 4 and 5 has a height of 43 mm. Accordingly, the above-described configuration of this embodiment is extremely advantageous in reduction of the thickness of the apparatus.

Each of the DC-DC converter circuits DV1 to DVn is not limited to the configuration as described above, and can be modified as shown in FIGS. 11A to 11C, for example. In FIGS. 11A to 11C, modifications have been made particularly to the AC-DC converting section which converts an AC voltage generated from the secondary winding 44B of the transformer 44 into a DC voltage.

In FIG. 11A, the secondary winding 44B of the transformer 44 is divided into segments 44B1 to 44B2 by a tap provided at the center thereof. The ends of the secondary winding 44B are respectively connected to the anodes of the diodes 61 and 62, the cathodes of the diodes 61 and 62 are connected together to one end of the output capacitor 48, and the other end of the output capacitor 48 is connected to the tap. Thus, either one of the diodes 61 and 62 supplies a current to the output capacitor 48 in accordance with the direction of the AC current flowing through the primary winding 44A. That is, the capacitor 48 can be charged even if the direction of the current flowing through the primary winding 44A is changed.

In FIG. 11B, the ends of the secondary winding 44B are respectively connected to the anodes of the diodes 63 and 64, the cathodes of the diodes 63 and 64 are connected together to one end of the output capacitor 48 through a coil 65, and the other end of the output capacitor 48 is connected to the other end of the secondary winding 44B. If an AC current flows to the primary winding 44A, a half-wave current is supplied from the diode 63 to the output capacitor 48 through the coil 65. The coil 65 supplies the current from the diode 64 to the output capacitor 48 when no current flows to the diode 63 to stabilize the current to be supplied to the output capacitor 48.

In FIG. 11C, the ends of the secondary winding 44B of the transformer 44 are respectively connected to the input terminals of the full-wave rectifier having diodes 66, 67, 68 and 69 connected in a bridge (i.e., the junction between the cathode of the diode 66 and the anode of the diode 67 and the junction between the cathode of the diode 68 and the anode of the diode 69), and the output capacitor 48 is connected between the output terminals of the full-wave rectifier (i.e., the junction between the cathode of the diode 67 and the cathode of the diode 69 and the junction between the anode of the diode 66 and the anode of the diode 68). This circuit can full-wave rectify the current to be supplied to the output capacitor 48 even if the direction of the current flowing through the secondary winding 44B of the transformer 44 is changed.

The DC-AC converting section of the DC-DC converter circuit is oscillated at a high frequency via the halfwave voltage resonance in the third embodiment. However, the DC-AC converting section can be replaced by another resonance circuit in which the resonance operation is controlled by means of switching elements. For example, it may be composed of a full-wave voltage resonance circuit, a half-wave current resonance circuit, a fullwave current resonance circuit, a half-bridge circuit or a full-bridge circuit.

FIG. 12 shows a circuit of a discharge lamp lighting apparatus according to a fourth embodiment of the present invention. This discharge lamp lighting apparatus is similar to the apparatus of the embodiment shown in FIG. 8. Therefore, the same portions as those in FIG. 8 are denoted by the similar or equivalent reference numerals in FIG. 12, and its detailed description will be omitted. The fourth embodiment of the apparatus further has a set of changeover switches 71 and 72 for periodically reversing the direction of the current flowing through a discharge lamp 35. The switch 71 has a first fixed contact 71A connected to the positive end of the series circuit of the output capacitors 48, a second fixed contact 71B connected to the negative end of the series circuit of the output capacitors 48, and a common contact 71C connected to the first electrode of the discharge lamp 35. The switch 72 has a first fixed contact 72A connected to the negative end of the series circuit of the output capacitors 48, a second fixed contact 72B connected to the positive end of the series circuit of the output capacitors 48, and a common contact 72C connected to the second electrode of the discharge lamp 35. The switch 71 and 72 are cooperated to switch the connecting state of the discharge lamp 35. In the switching operation, the common contacts 71C and 72C are simultaneously contacted with the first fixed contacts 71A and 72A or the second fixed contacts 71B and 72B. In other words, the discharge lamp 35 is set to a first connecting state between the positive and negative ends of the series circuit of the output capacitors 48 when the common contacts 71C and 72C are respectively contacted with the first fixed contacts 71A and 72A, and set to a second connecting state between the negative and positive ends of the series circuit of the output capacitors 48 when the common contacts 71C and 72C are respectively contacted with the second fixed contacts 71B and 72B.

In the discharge lamp lighting apparatus of the fourth embodiment, a current flows in a direction shown by an arrow with a solid line when the discharge lamp 35 is set to the first connecting state, and in a direction shown by an arrow with a broken line when the discharge lamp 35 is set to the second connecting state. More specifically, in this apparatus, an alternating current can flow to the discharge lamp 35 by repeating the switching operation of the switches 71 and 72. Accordingly, it can prevent mercury vapor filled in the discharge lamp 35 from collecting to one side of the first and second electrodes. This switching operation substantially lights the discharge lamp 35 in an AC lighting manner. However, since the oscillation frequencies of the DC-DC converter circuits DV1 to DVn can be set independently of the switching frequency, reductions in size and weight of the circuit parts are not restricted by the provision of the switches 71 and 72.

The changeover switches 71 and 72 are preferably semiconductor switching elements having no mechanical contact. However, switching elements having mechanical contacts may also be used. In this case, if the oscillations of the DC-DC converter circuits are temporarily interrupted immediately before the switching operations of the switches 71 and 72, power loss resulting from the switching operation can be alleviated. The switches 71 and 72 are not limited to the configuration described above, and can be replaced by other switches capable of reversing the direction of the current flowing through the discharge lamp 35.

In this fourth embodiment, one set of changeover switches 71 and 72 is added to the discharge lamp lighting apparatus of the third embodiment shown in FIG. 8. However, these may be added to the discharge lamp lighting apparatus of the first and second embodiments shown in FIGS. 6 and 7.

Figure 13:
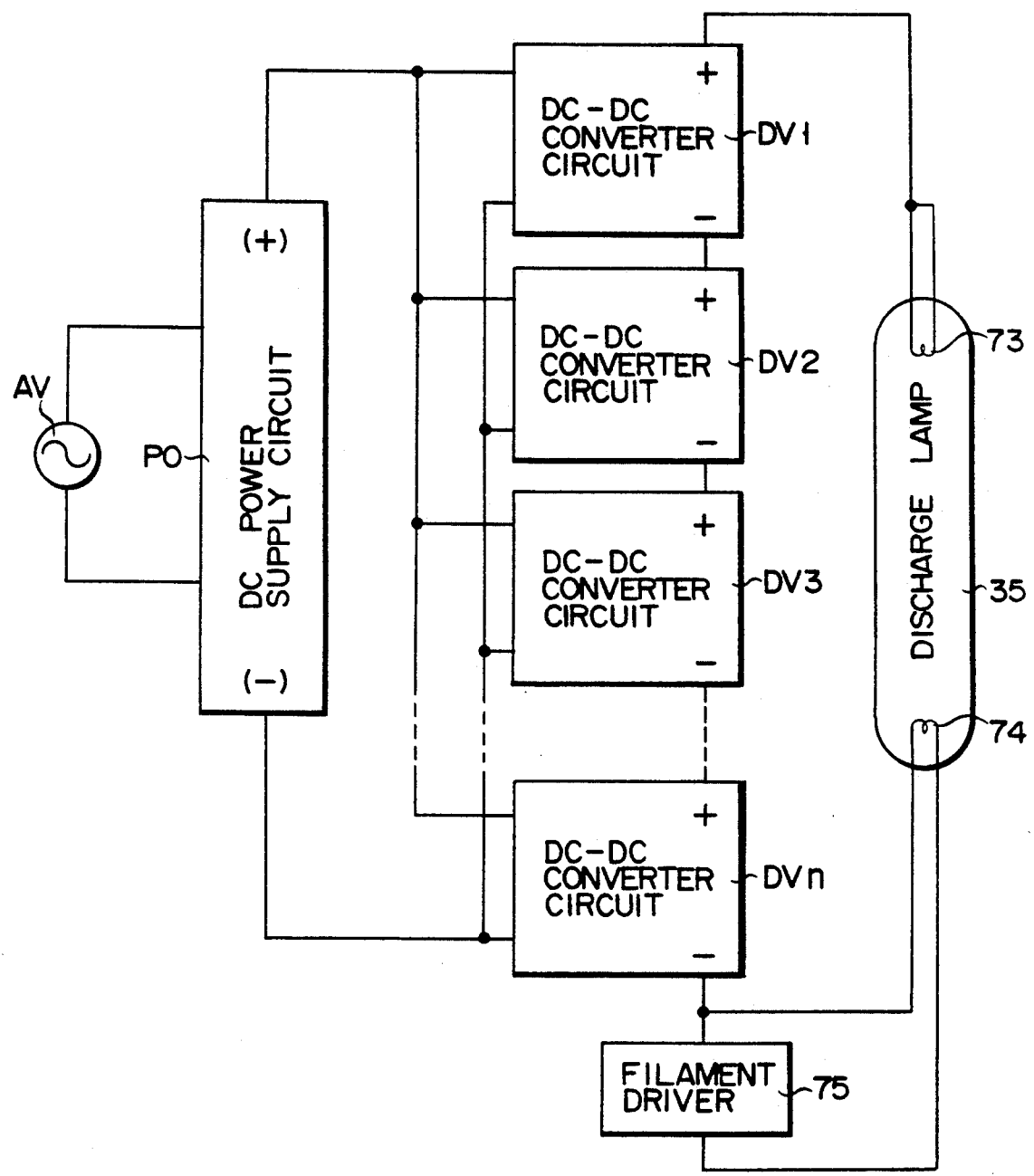
FIG. 13 is a circuit diagram of a discharge lamp lighting apparatus according to a fifth embodiment of the present invention, which apparatus is similar to the apparatus shown in FIG. 8 and has a filament driver for supplying a preheat current to a discharge lamp filament.

FIG. 13 shows a circuit of a discharge lamp lighting apparatus according to a fifth embodiment of the present invention. This fifth embodiment is similar to the apparatus of the embodiment shown in FIG. 8. Therefore, the same portions as those in FIG. 8 are denoted by the similar or equivalent reference numerals in FIG. 13, and the detailed description thereof will be omitted. This fifth embodiment of the discharge lamp lighting apparatus is used for lighting a discharge lamp 35 having filament electrodes 73 and 74, and comprises a filament driver 75 which supplies a preheating current to the negative filament electrode 74. This current is supplied when the discharge lamp 35 is ignited, and preheats the negative filament electrode 74 to accelerate electron emission therefrom. Accordingly, the discharge lamp 35 can be lit in a short preparation time.

The filament driver 75 may be designed to continuously heat the filament electrode 74 even after the ignition. Once the filament electrode 74 has been preheated, it does not require a large amount of power to maintain the electron emission at a satisfactory level. Accordingly, the filament driver 75 may reduce the power to be supplied to the filament electrode 74 after the ignition.

In this fifth embodiment, the filament driver 75 is provided to preheat the negative filament electrode 74. However, this embodiment is not so limited. For example, the filament driver 75 may be designed to preheat the positive filament electrode 73 in addition to electrode 74. Further, an independent filament driver may be provided for preheating the filament electrode 73. Particularly, in the case where the changeover switches 71 and 72 are provided as shown in 12, it is preferable to heat the filament electrodes 73 and 74. In addition, the above-described filament driver 75 may be incorporated into the first and second embodiments in FIGS. 6 and 7.

In the second to fifth embodiments described above, the discharge lamp 35 is connected between both the ends of the series circuit of the entire output capacitors 48. However, the discharge lamp 35 may be connected between both ends of the series circuit of only some of the output capacitors.

A discharge lamp lighting apparatus according to a sixth embodiment of the present invention will be described with reference to FIGS. 14 to 17.

Figure 14:
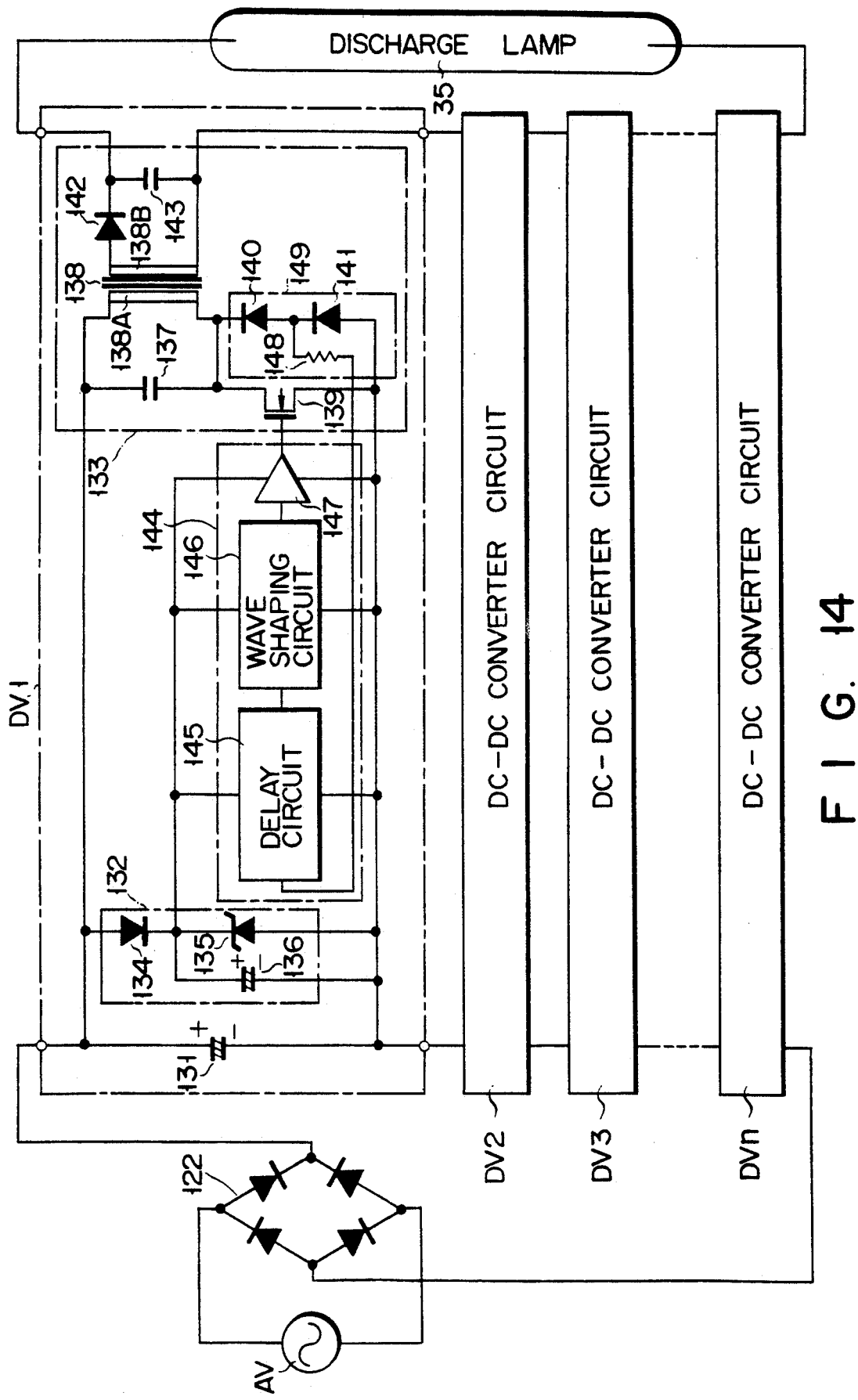
FIG. 14 is a circuit diagram of a discharge lamp lighting apparatus according to sixth embodiment of the present invention.

FIG. 14 shows a circuit of the discharge lamp lighting apparatus of the sixth embodiment. This discharge lamp lighting apparatus comprises a diode bridge circuit 122 serving as a DC power supply circuit which full-wave rectifies a power source voltage supplied from an AC power source AV such as a commercial power source and converts the power source voltage into a DC voltage, and n number of DC-DC converter circuits DV1 to DVn for converting parts of the voltage supplied from the diode bridge circuit 122 into DC voltages, which together produce a high DC voltage necessary for lighting a discharge lamp 35. The input sections of the DC-DC converter circuits DV1 to DVn are connected in series between the positive and negative output terminals of the diode bridge circuit 122. The diode bridge circuit 122 rectifies the power source voltage, for example, of 100 V and supplies it as a pulsating voltage to the series circuit of the input sections of the DC-DC converter circuits DV1 to DVn.

The pulsating voltage is divided by the series-connected input sections of the DC-DC converter circuits DV1 to DVn. Each of the DC-DC converter circuits DV1 to DVn includes a smoothing capacitor 131, a voltage regulating circuit 132, a converting unit 133 and an oscillation controller 144. The smoothing capacitor 131 is connected between input terminals of the input section. The voltage regulating circuit 132 has a diode 134, a Zener diode 135 and a smoothing capacitor 136. The diode 134 and the Zener diode 135 are connected in series with each other between both ends of the smoothing capacitor 131, and the smoothing capacitor 136 is connected in parallel with the Zener diode 135.

The converting unit 133 has capacitors 137 and 143, a transformer 138, a switching transistor (MOSFET) 139, diodes 140, 141 and 142, and a resistor 148. The capacitor 137 is connected in parallel with the primary winding 138A of the transformer 138 to form a resonance circuit. The resonance circuit is connected in series with the current path of the switching transistor 139 between both ends of the smoothing capacitor 131. A series circuit of the diodes 140 and 141 is connected in parallel with the switching transistor 139 in a reverse-biased direction. The capacitor 137, the primary winding 138A, the MOS type FET 139, and the diodes 140 and 141 constitute a DC-AC converting section which oscillates at a high frequency via a half-wave voltage resonance. The secondary winding 138B of the transformer 138 is connected to the output capacitor 143 through the diode 142. The output capacitors 143 of the DC-DC converter circuits DV1 to DVn are connected in series with each other, and a discharge lamp 35 is connected in parallel with the series circuit of these capacitors 143. The total sum of the output impedances of the DC-DC converter circuits DV1 to DVn is set at a value for limiting the current which is to flow through the discharge lamp 35 after the start of discharging to maintain the voltage across the discharge lamp 35 at a level required for continuing the discharge. The resistor 148 is cooperated with the diodes 140 and 141 to form a resonance voltage detector 149 which detects the voltage at the junction between the diodes 140 and 141 and supplies the voltage to a resonance control circuit 144 as a resonance detecting voltage. A resonance voltage detector 149 may be constituted by a resistor voltage divider or a capacitor voltage divider connected in parallel with the series circuit of the diodes 140 and 141, and a resistor 148 for supplying the voltage of the voltage dividing point of the voltage divider to the resonance control circuit 144. Further, one of the diodes 140 and 141 may be removed in this case.

The oscillation control circuit 144 includes a delay circuit 145, a wave shaping circuit 146 and a buffer circuit 147, each of which operates under the output voltage generated across the Zener diode 135. The delay circuit 145 delays the resonance detecting voltage supplied from the resonance voltage detector 149, the wave shaping circuit 146 regulates the duty ratio of the output voltage of the delay circuit 145, and the buffer circuit 147 supplies a voltage corresponding to the output voltage of the wave shaping circuit 146 to the gate of the switching transistor 139. The delay circuit 145 may be disposed behind the wave shaping circuit 146 to delay the output voltage of the wave shaping circuit.

Figure 15:
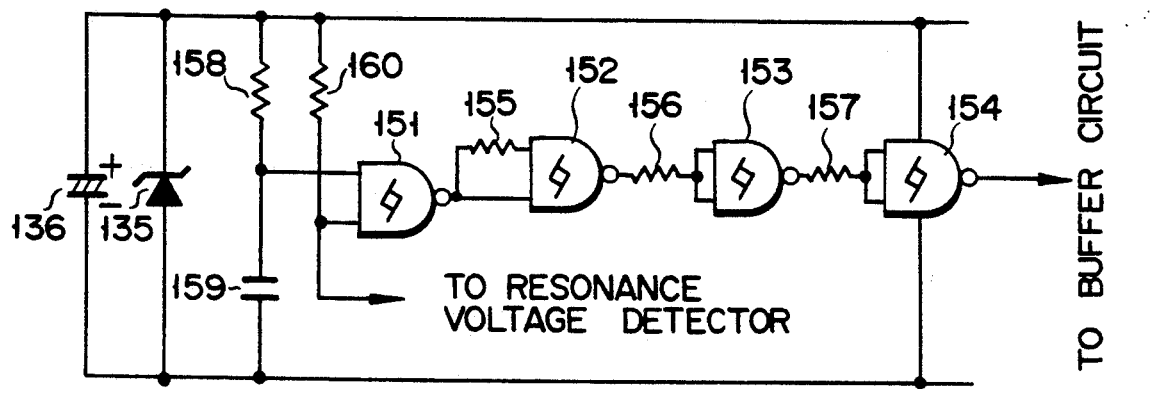
FIG. 15 is a view showing in detail a portion of a DC-DC converter circuit shown in FIG. 14.
Figure 16:
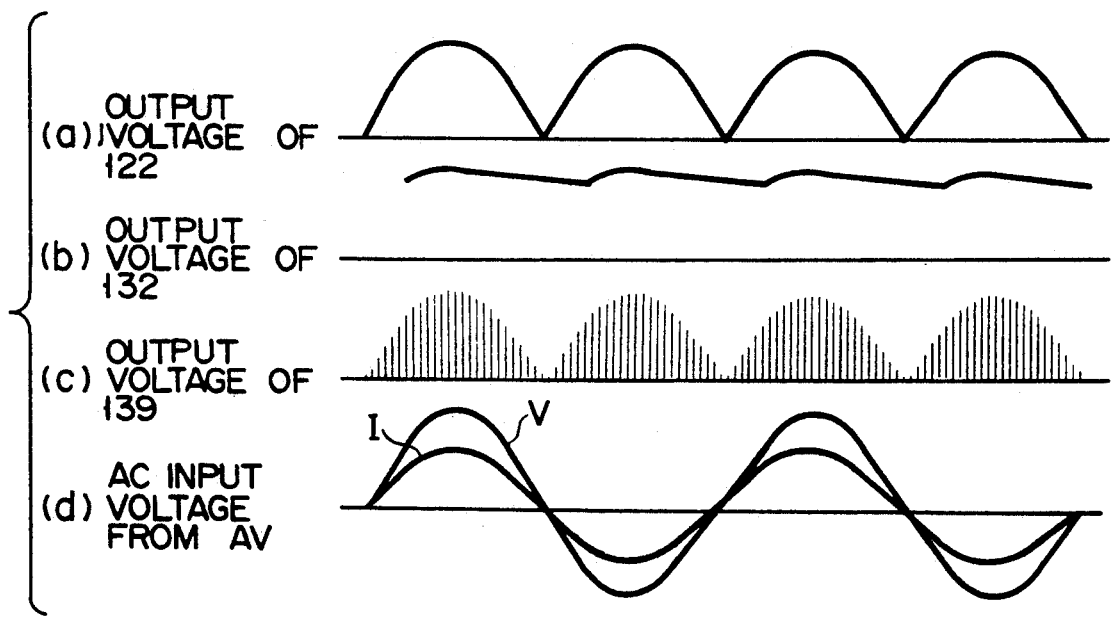
FIGS. 16 and 17 are voltage waveform diagrams for explaining the operation of the discharge lamp lighting apparatus shown in FIG. 14.
Figure 17:
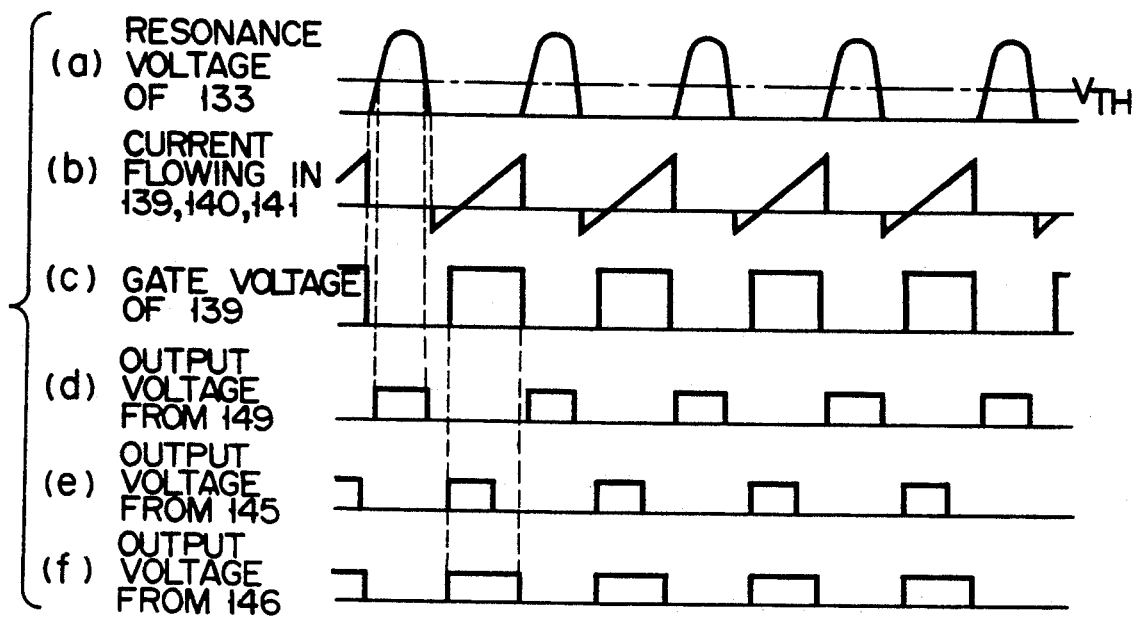

FIG. 15 shows part of the oscillation controller 144 in detail. The delay circuit 145 and the wave shaping circuit 146 have 2-input Schmitt NAND gates 151, 152, 153, and 154, resistors 155, 156, 157, 158, and 160 and a capacitor 159, as shown in FIG. 15. The resistor 158 and the capacitor 159 are connected in series with each other between both ends of the diode 135, and the first input terminal of the NAND gate 151 of the initial stage is connected to the junction between the resistor 158 and the capacitor 159. The second input terminal of the NAND gate 151 is connected to the positive terminal of the diode 135 through the resistor 160, and connected to one end of the resistor 148 of the resonance voltage detector 149. The resistor 160 is used to initially supply a high level signal for starting a self-excited oscillation to the second input terminal of the NAND gate 151. The output terminal of the NAND gate 151 is connected directly to the first input terminal of the NAND gate 152 of next stage, and further connected to the second input terminal of the NAND gate 152 through the resistor 155. The output terminal of the NAND gate 152 is connected to the first and second input terminals of the NAND gate 153 of a third stage through the resistor 156. The output terminal of the NAND gate 153 is connected to the first and second input terminals of the NAND gate 154 of the final stage through the resistor 157. The output terminal of the NAND gate 154 is connected to the input terminal of the buffer circuit 147. A CR time constant circuit of resistor 158 and the capacitor 159 maintains the first input voltage of the NAND gate 151 at a level lower than the threshold level thereof for a preset period after a voltage has been generated from the diode 135. Therefore, an unstable oscillation can be prevented immediately after the power source is turned on.

In this embodiment, when the AC power source AV is turned on, the diode bridge circuit 122 applies the pulsating voltage of the full-wave rectified waveform as shown in FIG. 16(A) to a series of the input sections (or smoothing capacitors 131) of the DC-DC converter circuits DV1 to DVn. The pulsating voltage is divided by the smoothing capacitors 131. In each of the DC-DC converter circuits DV1 to DVn, the voltage regulating circuit 132 receives a divided voltage output from the capacitor 131 and charges the smoothing capacitor 136 at a level equal to the peak value of the received voltage. The diode 134 maintains the output voltage of the capacitor 136 upon drop of the peak voltage so as to stabilize the voltage across the Zener diode 135. As a result, the voltage regulating circuit 132 generates a constant voltage having a waveform as shown in FIG. 16(B). Thus, the oscillation control circuit 144 can stably perform the control operation under the constant voltage from the voltage regulating circuit 132.

The output voltage of the smoothing capacitor 131 is also applied to the converting unit 133, thereby starting the oscillation of the converting unit 133. At this time, a high frequency resonance voltage as shown in FIG. 16(C) is generated between both ends of the FET 139. The level of the resonance voltage varies dependently on the waveform of the pulsating voltage obtained by rectifying the power source voltage from the AC power source AV shown in FIG. 16(D). In the resonance voltage detector 149, the resonance voltage is divided by the diodes 140 and 141 to supply the resonance detecting voltage.

FIG. 17(A) shows a resonance voltage generated from the converting unit 133, FIG. 17(B) shows a current which flows through each of the FET 139 and the series circuit of the diodes 140, 141 in accordance with the resonance voltage, and FIG. 17(C) shows a switch control voltage to be applied from the buffer circuit 147 to the gate of the FET 139. The resonance voltage detector 149 generates a pulse-like output voltage shown in FIG. 17(D). This voltage is set at a high level when the resonance voltage exceeds a threshold voltage VTH, and otherwise to a low level. The resonance voltage detector 149 inputs such an output voltage to the delay circuit 145 of the oscillation control circuit 144 as the resonance detecting voltage. The delay circuit 145 delays the input voltage for a predetermined time, and supplies an output voltage shown in FIG. 17(E) to the wave shaping circuit 146. The wave shaping circuit 146 regulates the duty ratio of the output voltage as a ratio of the on period to off period of the FET 139, and further wave-shapes to supply the output voltage as shown in FIG. 17(F) to the buffer circuit 147.

More specifically, the resonance detecting voltage is supplied to the second input terminal of the NAND gate 151 of the oscillation control circuit 144. This voltage is wave-shaped by the Schmitt type NAND gate 151 which operates in a comparator manner, and supplied from the NAND gate to the first input terminal of the NAND gate 152 directly and to the second input terminal of the NAND gate 152 through the resistor 155. The NAND gate 152 regulates the duty ratio of the output voltage of the NAND gate 151 according to the difference in the input timings of voltage caused by the resistor 155. The output voltage of the NAND gate 152 is supplied to the NAND gate 153 with a delay caused by the resistor 156. The output voltage of the NAND gate 153 is supplied to the NAND gate 154 with a delay caused by the resistor 157, and finally wave-shaped by the NAND gate 154. The buffer circuit 147 generates a switching control signal corresponding to the output voltage of the NAND gate 154 and supplies the switch control voltage to the gate of the FET 139.

Assuming that each of the DC-DC converter circuits DV1 to DVn is designed to convert the input voltage of 12 V to an output voltage of 80 V at the time of no load, it is possible to convert the input voltage of 144 V to an output voltage of 960 V at the time of no load by setting the number n of the DC-DC converter circuits to 12. When the AC power source AV is a rated voltage of 100 V, its peak voltage becomes 144 V. Accordingly, the DC-DC converter circuits operate under the power source voltage from the AC power source AV without fail to obtain a high voltage necessary to light the discharge lamp 35.

In this embodiment, the total output impedance of the DC-DC converter circuits DV1 to DVn is operated as a ballast for limiting the current which is to flow through the discharge lamp 35 after discharging is started, hence the discharge lamp 35 is stably lit.

The power source voltage of the AC power source AV is rectified and then supplied directly to the DC-DC converter circuits DV1 to DVn. Since the rectified voltage is supplied to the DC-DC converters DV1 to DVn without smoothing, the input currents of the DC-DC converter circuits DV1 to DVn have a waveform near a sine wave and also the same phase as the voltage phase. Accordingly, it is possible to improve the power factor and satisfactorily suppress the power supply noise.

Since the oscillation frequency (i.e., resonance frequency of the resonance circuit) of each DC-DC converter circuit DV1 to DVn is irrespective of the lighting frequency of the discharge lamp 35, the oscillation frequency can be set higher than 1 MHz. This makes it possible to use a transformer having a sufficiently low inductance, and which is generally light and small.

The smoothing capacitor 131 is set to have a capacitance which can suppress the voltage variation caused by the oscillation current of the converter circuit, and the output voltage of each converter circuit is increased in response to an increase in the input voltage thereof. Thus, the converter circuit allows the voltage across the smoothing capacitor 131 to be rapidly reduced when power consumption is increased in response to an increase in the input voltage. On the other hand, when the input voltage is low and the power to be supplied to the discharge lamp 35 is low, the voltage across the smoothing capacitor 131 is prevented from being reduced.

There is a case where a series of the smoothing capacitors 131 does not have a designed voltage dividing ratio due to an irregularity in the characteristics of the DC-DC converter circuits DV1 to DVn. However, the variation in the voltage dividing ratio can be compensated since the converter circuits DV1 to DVn have output characteristics proportional to the input voltage. Therefore, even if the voltage driving ratio is varied due to a slight irregularity in the circuit parts, an excessive voltage is not applied to a specific converter circuit as the divided voltage. Accordingly, the circuit parts of each converter are not necessary to have withstand voltages sufficiently higher than the divided voltage. That is, the circuit parts of small-size and low cost can be used to form the discharge lamp lighting apparatus.

In the DC-DC converter circuits DV1 to DVn, the voltage across the smoothing capacitor 131 determines the resonance voltage. If the peak of the resonance voltage cannot exceed the threshold level VTH of the resonance voltage detector 149 due to a drop in the voltage across the smoothing capacitor 131, the resonance voltage detector 149 and the oscillation control circuit 144 do not constitute a self-excited oscillation loop. Thus, the oscillation of the converting unit 133 is stopped. At this time, the voltage across the capacitor 131 is prevented from dropping further since the electric power is not output from the converting unit after the oscillation is stopped. When one of the DC-DC converter circuits DV1 to DVn is thus made inactive, the other converter circuits operate to increase the voltage across the smoothing capacitor 131 of the inactive converter circuit. As a result, the converting unit 133 of the inactive converter circuit re-starts oscillation to produce part of the electric power to be supplied to the discharge lamp 35.

As described above, each of the DC-DC converter circuits DV1 to DVn stop oscillating in response to the voltage drop. Therefore, an excessive voltage can be prevented from being applied to the other converter circuits. Accordingly, the voltage dividing ratio of the smoothing capacitor 131 can be maintained even if the converter circuit is malfunctioned due to certain cause.

Figure 18:
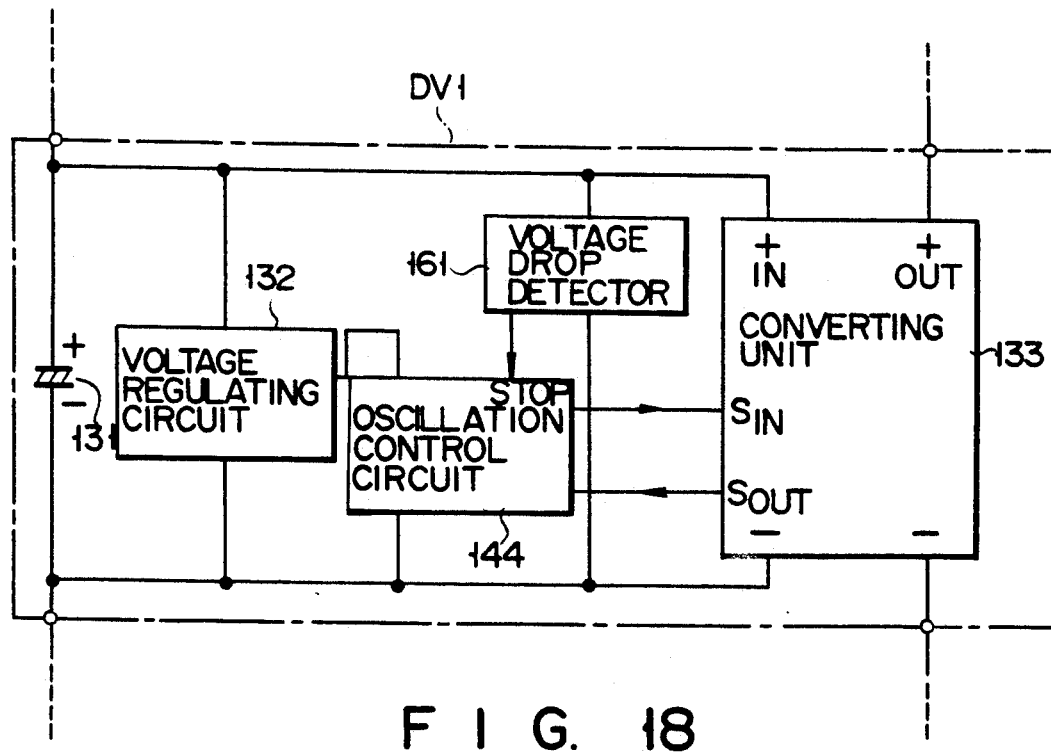
FIG. 18 is a view showing a DC-DC converter circuit of the discharge lamp lighting apparatus according to a seventh embodiment of the present invention.

A discharge lamp lighting apparatus of a seventh embodiment of the present invention will be described with reference to FIG. 18.

This lighting apparatus is similar to the sixth embodiment of that shown in FIG. 14. Accordingly, FIG. 18 shows one of DC-DC converter circuits of the discharge lamp lighting apparatus of this seventh embodiment. In FIG. 18, the same portions as those in FIG. 14 are denoted by the similar or equivalent reference numerals, and the detailed description thereof will be omitted. Each of DC-DC converter circuits of this lighting apparatus further comprises a voltage drop detector 161 which operates under the output voltage of a smoothing capacitor 131. The voltage drop detector 161 detects the drop of the output voltage of the capacitor 131, and supplies a detection signal to an oscillation control circuit 144. In this embodiment, it is not necessary to provide a resonance voltage detector 149 as shown in FIG. 14 in a converting unit 133. Instead, a status signal SOUT indicating whether or not the converting unit 133 is oscillated, is supplied from the converting unit 133 to the oscillation control circuit 144.

In this embodiment, if the voltage across the smoothing capacitor 131 is kept at a low level for an unusually long period in a specific DC-DC converter circuit such as, for example, in the DC-DC converter circuit DV1, a detection signal is supplied from the voltage drop detector 161 to the oscillation control circuit 144, and the oscillation control circuit 144 stops oscillation of the converting unit 133 (or makes the oscillation weak).

When the oscillation of the converting unit 133 is stopped, the electric power is not output from the converting unit 133. Accordingly, the voltage across the smoothing capacitor 131 is prevented from dropping further. At the time when one of the DC-DC converter circuits DV1 to DVn is thus made inactive, the other converter circuits operate to increase the voltage across the smoothing capacitor 131 of the inactive converter circuit. As a result, the converting unit 133 of the inactive converter circuit re-starts oscillation to produce part of the electric power to be supplied to the discharge lamp 35.

As described above, each of the DC-DC converter circuits stop oscillating in response to the voltage drop. Therefore, an excessive voltage can be prevented from being applied to the other converter circuits. Accordingly, the voltage dividing ratio of the smoothing capacitor 131 can be maintained even if the converter circuit is malfunctioned due to certain cause. More specifically, a stable oscillation control can be realized since the circuit parts for forming the converter circuits are not damaged due to the voltage drop.

In this embodiment, similar effects to those regarding the structure common to the previous embodiments are obtained.

In the sixth and seventh embodiments, the DC power supply circuit has a diode bridge circuit 122 for full-wave rectifying a power source voltage from an AC power source AV and applying the pulsating voltage to the DC-DC converter circuits. However, the DC power supply circuit is not limited to the bridge circuit 122, but may be composed in any configuration if the DC voltage including the pulsating component can be supplied.

The oscillation control circuit 144 of the sixth and seventh embodiments has four Schmitt NAND gates and three resistors to form the delay circuit 145 and the wave shaping circuit 146, but is not limited to this.

Further, the DC-DC converter circuit of the sixth and seventh embodiments operates via a half-wave voltage resonance. However, it can be replaced by a DC-DC converter circuit having primary and secondary sides which are electrically separated.

What is claimed is:

1. A discharge lamp lighting apparatus comprising a plurality of voltage converting units, each including:
    leakage transformer means for stepping up an AC power source voltage from an AC power source to produce part of a high output voltage required for lighting a discharge lamp;
    rectifier means for rectifying the voltage produced by said transformer means; and
    capacitor means for storing charge of the DC current supplied from said rectifier means;
    wherein said capacitor means of said plurality of voltage converting units are connected in series with each other between both ends of said discharge lamp, and
    said leakage transformer means having a selected leakage inductance and said capacitor means having a selected capacitance, such that the apparatus has an output impedance capable of limiting the current which is to flow through said discharge lamp after the start of discharging to maintain the voltage across the discharge lamp at a level required for continuing the discharge.

2. A discharge lamp lighting apparatus comprising a plurality of voltage converting units, each including:
   inverter means for converting a DC power source voltage to a high frequency voltage by oscillating the DC power source voltage;
   transformer means for stepping up the high frequency voltage supplied from said inverter means to produce part of a high output voltage required for lighting a discharge lamp;
   rectifier means for rectifying the voltage produced by said transformer means; and
   capacitor means for storing charge of the DC current supplied from said rectifier means;
   wherein said capacitor means of said plurality of voltage converting units are connected in series with each other between both ends of said discharge lamp, and
   each said inverter means has a selected oscillating frequency and said capacitor means has a selected capacitance, such that the apparatus has an output impedance capable of limiting the current which is to flow through said discharge lamp after the start of discharging to maintain the voltage across the discharge lamp at a level required for continuing the discharge.

3. An apparatus according to claim 2, further comprising power supply means for stepping down and rectifying an AC power source voltage from a commercial AC power source to obtain said DC power source voltage.

4. An apparatus according to claim 2, wherein each inverter means includes an LC resonance circuit to which said DC power source voltage is supplied, and switching means connected in series with said LC resonance circuit for periodically reversing the direction of the current flowing through said LC resonance circuit.

5. An apparatus according to claim 2 wherein each inverter means includes:
   an LC resonance circuit having a capacitor and a coil which are connected in parallel with each other; and
   switching means having a diode and a resonance switch which are connected in parallel with each other.

6. An apparatus according to claim 2, wherein said transformer means comprises a transformer having a primary winding and a secondary winding magnetically coupled to said primary winding.

7. An apparatus according to claim 6, wherein the secondary winding of said transformer includes a tap connected to one end of the said capacitor means, and said rectifier means includes a first diode having an anode connected to one end of said secondary winding and a second diode having an anode connected to an opposite end of said secondary winding and said first and second diodes having cathodes commonly connected to an opposite end of said capacitor means.

8. An apparatus according to claim 6, wherein said rectifier means includes first and second diodes having cathodes connected to each other, said first diode having an anode connected to one end of the secondary winding of said transformer and said second diode having an anode connected to an opposite end of the secondary winding of said transformer, a coil connected between a junction of the cathodes of said first and second diodes and one end of said capacitor means, and an opposite end of the secondary winding of said transformer is connected to an opposite end of said capacitor means.

9. An apparatus according to claim 6, wherein said rectifier means is formed of a diode-bridge circuit having an input section connected between ends of the secondary winding and an output section connected between ends of said capacitor means.

10. An apparatus according to claim 2, which further comprises power supply means for rectifying a commercial AC power source voltage, and wherein said plurality of voltage converting units includes capacitors which are connected in series with each other between output terminals of said power supply means and divide the output voltage thereof to obtain said DC power source voltage.

11. An apparatus according to claim 10, wherein each inverter means includes voltage regulating means for reducing the ripple of said DC power source voltage.

12. An apparatus according to claim 10, wherein each inverter means further includes oscillating means for generating a high frequency voltage under said DC power source voltage.

13. An apparatus according to claim 12, wherein said oscillating means includes an LC resonance circuit and a switching element connected in series with said LC resonance circuit for periodically reversing the direction of the current flowing through said LC resonance circuit.

14. An apparatus according to claim 13, wherein said oscillating means includes detecting means for detecting a resonance voltage from said LC resonance circuit and a switching control means for feeding the resonance voltage to said switching element, said switching control means being constituted by a series of a delay circuit, a wave-shaping circuit for regulating the duty ratio, and a buffer circuit.

15. An apparatus according to claim 14, wherein each inverter means includes oscillation interrupting means for interrupting the operation of the oscillating means upon drop of said DC power source voltage.

16. An apparatus according to claim 15, wherein said oscillation interrupting means includes a circuit for inhibiting the operation of said switching control means to interrupt the operation of oscillating means.

17. An apparatus according to claim 1, further comprising switching means for reversing the direction of the current flowing through said discharge lamp.

18. An apparatus according to claim 2, further comprising switching means for reversing the direction of the current flowing through said discharge lamp.

19. An apparatus according to claim 11, wherein said discharge lamp has a negative filament electrode, further comprising preheating means for allowing a preheat current to flow in at least the negative filament electrode of said discharge lamp.

20. An apparatus according to claim 2, wherein said discharge lamp has a negative filament electrode, further comprising preheating means for allowing a preheat current to flow in at least the negative filament electrode of said discharge lamp.

21. An apparatus according to claim 11, which further comprises power supply means for rectifying a commercial AC power source voltage, and wherein said plurality of voltage converting units includes capacitors which are connected in series with each other between output terminals of said power supply means and divide the output voltage thereof to obtain said DC power source voltage.

* * * * *